United States Patent [19]

Young

[11] Patent Number: 4,597,364

[45] Date of Patent: Jul. 1, 1986

[54] FUEL CONTROL SYSTEM FOR GASEOUS FUELED ENGINES

[75] Inventor: Colin G. Young, Mississauga, Canada

[73] Assignee: Emco Wheaton International Limited, London, Canada

[21] Appl. No.: 668,009

[22] Filed: Nov. 5, 1984

Related U.S. Application Data

[62] Division of Ser. No. 605,274, Apr. 30, 1984, Pat. No. 4,449,509.

[51] Int. Cl.⁴ .............................................. F02B 3/00
[52] U.S. Cl. ............................... 123/27 GE; 123/526; 123/577
[58] Field of Search .......... 123/525, 527, 526, 27 GE, 123/577

[56] References Cited

U.S. PATENT DOCUMENTS 3,540,419 11/1970 Fox ................................. 123/27 GE
4,416,244 11/1983 McDonald ........................ 123/525

Primary Examiner—E. Rollins Cross
Attorney, Agent, or Firm—Fetherstonhaugh & Co.

[57] ABSTRACT

In a diesel engine, the improvement of a fuel control system for use in providing a timed supply of gaseous fuel from a high pressure source to each air input. The control system comprises a flow control valve associated with each air input, the flow control valve being adapted to open to communicate with its associated air input and to close to interrupt communication with its associated air input. A fuel supply system is provided for supplying gaseous fuel under pressure to each flow control valve. A sensor is provided for determining when diesel fuel is being injected into each cylinder and generating a control signal which indicates when fuel injection occurs and communicates the control signal to the fuel control valve associated with the cylinder which is next in the firing order to that receiving diesel fuel such that the control signal is effective to open said flow control to admit gaseous fuel to the input air of said cylinder which is next in firing order.

8 Claims, 8 Drawing Figures

FUEL CONTROL SYSTEM FOR GASEOUS FUELED ENGINES

RELATED APPLICATIONS

This application is a division of application Ser. No. 605,274 filed Apr. 30, 1984, now U.S. Pat. No. 4,449,509.

FIELD OF INVENTION

This invention relates to fuel control systems for internal combustion engines. In particular, this invention relates to improved fuel control systems for gaseous fueled engines.

PRIOR ART

Considerable difficulty has been experienced in attempting to control the supply of gaseous fuel to internal combustion engines in a manner which will provide for the efficient operation of the engine.

It is well known that the fuel requirements of an engine will vary according to load conditions and that the load requirements can be determined by monitoring a number of operating variables. To date, however, no effective fuel control system has been developed which will optimize the supply of gaseous fuel to an internal combustion engine for all load operating conditions of the engine.

The gaseous fuel which is supplied to an internal combustion engine is preferably supplied at a positive pressure and considerable difficulty has been experienced in attempting to control the supply of the pressurized gaseous fuel in a manner which will ensure that the fuel supply is appropriate to the engine loading conditions.

An important limitation in the prior systems is that they are not suitable for use with both propane and methane or gases of differing heat values.

When previous gaseous fueled carburetion systems have been used in dual fuel applications, the efficiency of the engine when running on gasoline has been impaired with the result that it has been necessary to modify and rectify the emissions performance. This results from the fact that it has been necessary to place a restriction in the system to create a negative signal to withdraw the fuel from the converter and this restriction reduces the engine efficiency.

Typically, a plurality of carburetor sizes are provided to accommodate different size engines in the known systems. This leads to a multiplicity in the stock which must be maintained by a supplier or servicing facility.

In addition, conventional conversion systems employ adaptors for use to establish a communication with different engine throttle systems or intake manifolds and a wide range of adaptors are required.

Prior gas fueled systems frequently require replacement of original air clearance and experience hood fouling problems requiring the use of adaptors which destroy the aesthetics of the original engine design. In addition, it is frequently necessary to modify a gasoline carburetor by adding spacers, lengthen the choke rod or the like in order to permit operation using gaseous fuel.

In previous systems, difficulty has also been experienced in obtaining accurate air:fuel metering characteristics.

Furthermore, with conventional gaseous fueled systems, the maximum flow or maximum power adjustments can only be set with the engine operating on a dynometer at maximum speed and a wide open throttle.

Considerable difficulty has also been experienced in starting gaseous fueled engines in cold weather conditions because of the lack of the ability to draw the correct amount of fuel from the converter under these conditions.

Prior gaseous fueled systems are not adaptable for use in supplementing the fuel supply of a diesel engine.

Difficulty has also been experienced in obtaining an even distribution of fuel to each of the cylinders of an engine.

SUMMARY OF INVENTION

It is an object of the present invention to overcome the difficulties of the prior art described above and to provide a fuel control system for use in supplying gaseous fuel to an engine which will adjust the fuel supply according to engine load conditions.

It is a further object of this invention to provide a further supply of gaseous fuel to a diesel engine in which fuel is supplied to the air intake of the cylinder next in firing order to that in which combustion is taking place.

The difficulties previously experienced in adapting a carburetion system for use with fuels of different heating values can be easily overcome by the present system in which the electronic gain or the spring loading can be altered to adjust the rate at which the pressure of the fuel supply changes for different fuels.

By employing a positive pressure system, it is not necessary to place a restriction in the system and consequently, the operation of a gasoline carburetor is not adversely affected by being connected to the fuel control system of the present invention.

Because the present invention permits the installer to alter the outlet pressure of the fuel, a single size fuel control system is all that is required regardless of the size of the engine.

Similarly, the system of the present invention does not require the use of adaptors as it can be universally applied to one of the conventional gasoline engines presently in use.

The present carburetion system can be installed without moving, or replacing the existing equipment, such as the air cleaner or carburetor and without adding any adaptors with the result that the aesthetics of the original engine design are not altered and the gasoline emissions or not altered.

The carburetion system of the present invention senses the engine loading and the engine speed and adjusts the air:fuel mixture according to the load conditions.

The carburetion system of the present invention also provides a feedback system which, regardless of varying operating conditions such as the temperature of the gaseous fuel in the storage tank, provides constant outlet pressures as required.

A further feature of the carburetion system is that it is compatible with current computer controlled emission systems and will function with the gaseous fueled system in a like manner to that when used with a gasoline system.

The present carburetion system permits maximum power adjustment to be set by adjusting the setting of the modulator when the engine is not running. The amount of fuel required for a particular engine can be determined from a chart or other listing previously established and consequently, the power adjustment can be made without requiring a dynamometer or road testing.

The present system also does not require the introduction of a restriction in the air intake as the fuel is supplied at a positive pressure and consequently no power loss results from the use of the present system.

The present system also supplies the correct amount of fuel regardless of engine speed with the result that the difficulties previously experienced in obtaining cold weather starting have been overcome.

The present system is suitable for use in supplying gaseous fuel to a diesel engine despite the absence of a throttle.

By mixing the air and gaseous fuel in the air filter of the engine of the present system, the air:fuel mixture has a greater residence time than that previously available and this serves to provide a more even fuel distribution throughout the various cylinders of the engine.

According to one aspect of the present invention, there is provided a fuel control system for use in supplying gaseous fuel from a high pressure source of gaseous fuel to an internal combustion engine which has an air/fuel intake through which air and gaseous fuel are supplied to the engine and means indicative of engine loading conditions which comprises, a pressure regulator having an input for receiving pressurized gaseous fuel from said source and an output for discharging gaseous fuel, said pressure regulator being adapted to maintain a constant pressure in the discharging fuel for a given engine speed regardless of flow rate and to increase or decrease the pressure in the discharging gaseous fuel in response to an increase or decrease in engine speed, a flow control valve having an input communicating with the output of said pressure regulator and an output communicating with said air/fuel intake of said engine, said flow control valve having a valve actuator member which communicates with said means which is indicative of engine loading conditions so as to be operable to control the flow of gaseous fuel from its output in response to engine loading conditions regardless of engine speed, control means communicating with said engine for measuring the speed of the engine and generating a first signal which is indicative of the engine speed, modulator means communicating with the output from the pressure regulator to measure the pressure of the fuel supply to the flow control valve, said modulator also communicating with the control means to receive said first signal, said modulator means being adapted to compare the measured pressure with the measured speed and to generate a third signal which is indicate of an undesirably low pressure or a fourth signal which is indicative of an undesirably high pressure, said third or fourth signals being communicated to said control means, pressure control means communicating with said pressure regulator to increase or decrease the pressure in the gaseous fuel output in response to the receipt of said third or fourth signals respectively.

According to a further aspect of the present invention, there is povided in a diesel engine having a plurality of cylinders, each having associated therewith a diesel fuel input line and an air input through which a fresh charge of induction air is induced, a fuel pump communicating with each diesel fuel line for sequentially supplying fuel under pressure to each diesel fuel line in the required firing order, the improvement of a fuel control system for use in providing a timed supply of gaseous fuel from a high pressure source to each air input comprising a flow control valve associated with each air input, said flow control valve being adapted to open to communicate with its associated air input and to close to interrupt communication with its associated air input, means for supplying gaseous fuel under pressure to each flow control valve, means for determining when diesel fuel is being injected into each cylinder and generating a control signal which indicates when fuel injection occurs and communicates said control signal to the fuel control valve associated with the cylinder which is next in the firing order to that receiving diesel fuel such that the control signal is effective to open said flow control to admit gaseous fuel to the input air of said cylinder which is next in firing order.

BRIEF DESCRIPTION OF DRAWINGS

With reference to FIG. 1 of the drawings, the reference numeral 10 refers generally to a fuel control system for use in supplying gaseous fuel from a high pressure source 12 to an internal combusion engine 14.

Figure 1:
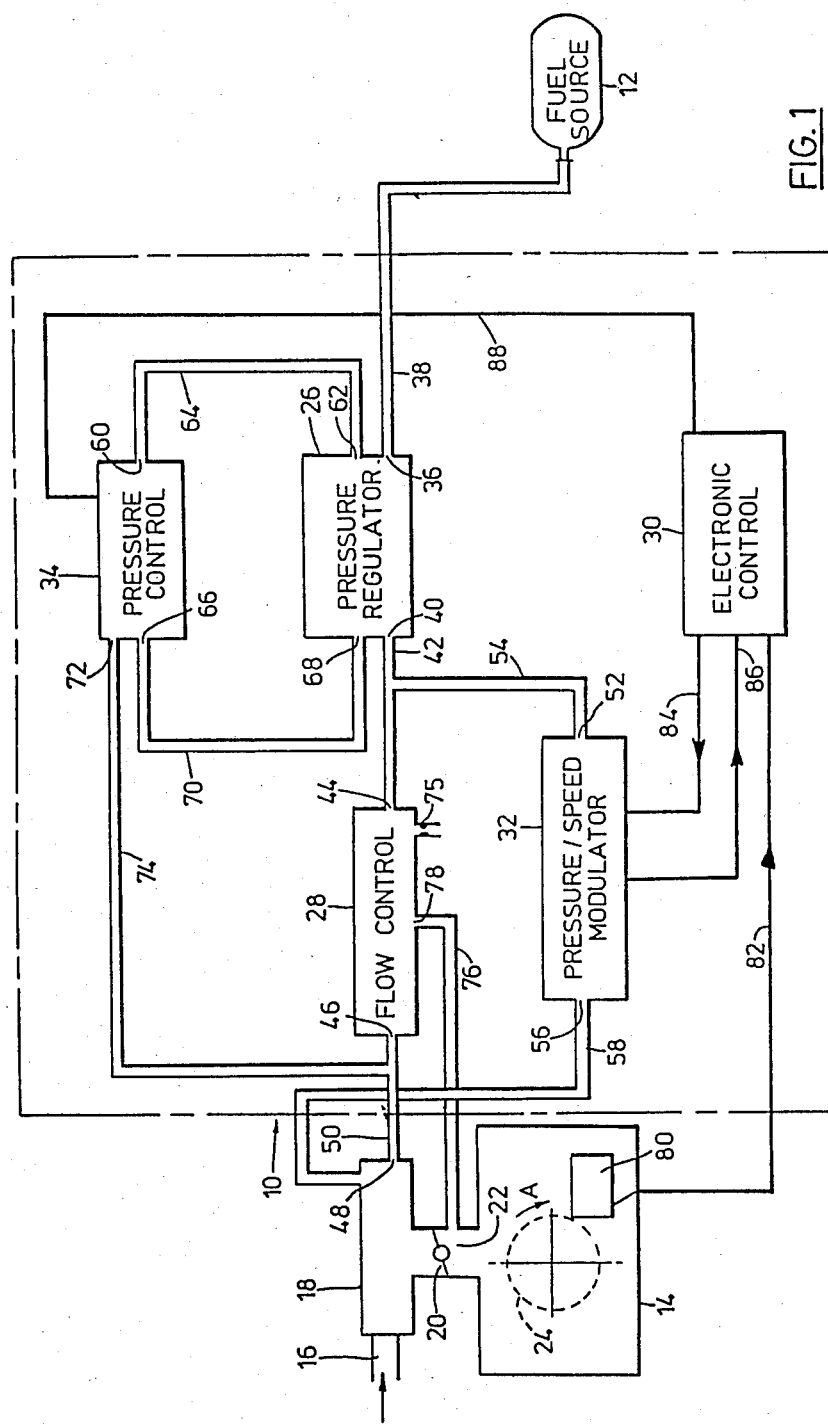
FIG. 1 is a block diagram illustrating a fuel flow control system in accordance with an embodiment of the present invention.

The fuel source may be a high pressure gas storage tank and the fuel may be propane, liquid natural gas (LNG), or the like which is supplied to the engine in the gaseous phase.

The engine 14 may be any conventional gas fired engine which includes an air intake 16 through which air is supplied to the air filter housing 18. A throttle 20 controls the supply of air fuel mixture to the intake manifold 22. A drive shaft 24 is mounted for rotation in the direction of the arrow A.

The fuel control system 10 comprises a pressure regulator 26, a flow control valve 28, an electronic control device 30, a pressure/speed modulator 32 and a pressure control device 34.

The pressure regulator 26 has an input 36 communicating with a fuel source 12 by way of a conduit 38. The pressure regulator 26 also has an output 40 which communicates with the input 44 of the flow control device 28 by means of conduit 42. The flowcontrol device 28 has an output 46 which communicates with the input 48 of the air/fuel intake 18 through conduit 50.

The pressure/speed modulator 32 has an input 52 which is connected to the conduit 42 by way of conduit 54. The pressure/speed modulator 32 has an outlet 56 which is connected by way of conduit 58 to within the filter element of the intake housing 18.

The pressure control device 34 has an input 60 which is connected to an output 62 of the pressure regulator 26 by way of conduit 64. The pressure control device 34 also has an output 66 which is connected to an input 68 of the pressure regulator 26 by way of conduit 70. The pressure regulator 34 also has a further output 72 which is connected to conduit 50 by means of conduit 74.

The manifold vacuum 22 is connected by means of a conduit 76 to an input 78 of the flow control device 28.

The electronic control device 30 communicates with an engine speed monitoring device 80 by way of line 82. The electronic control device 30 is also connected to the modulator 32 by way of lines 84 and 86. The electronic control device 30 is also connected to the pressure control device 34 by way of line 88.

The structure of a preferred form of pressure regulator 26, modulator 32 and pressure control 34 will now be described with reference to FIGS. 2 and 3 of the drawings.

Figure 2:
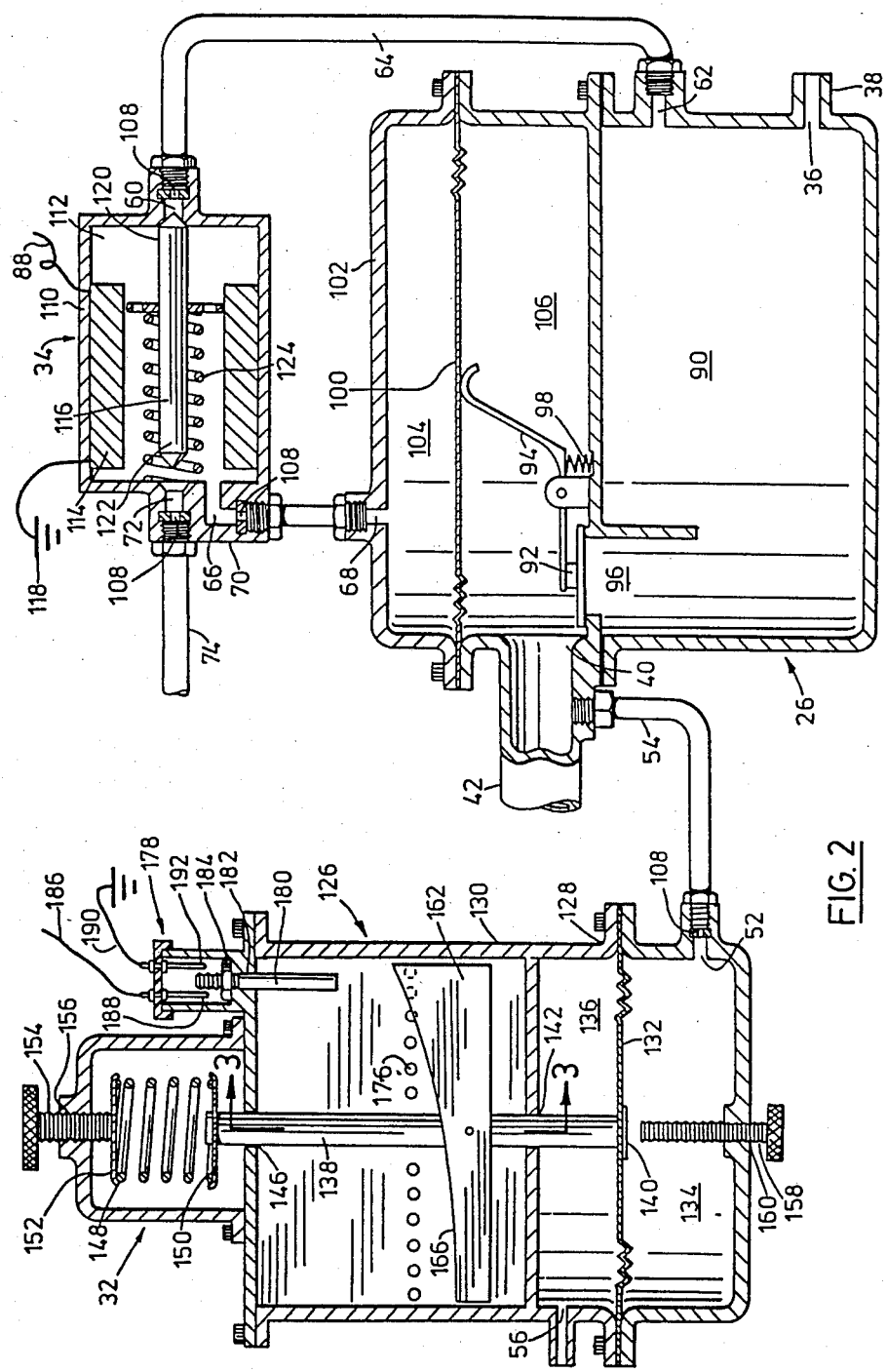
FIG. 2 is a diagram illustrating the pressure regulator, pressure control valve and pressure/RPM modulator in section.
Figure 3:
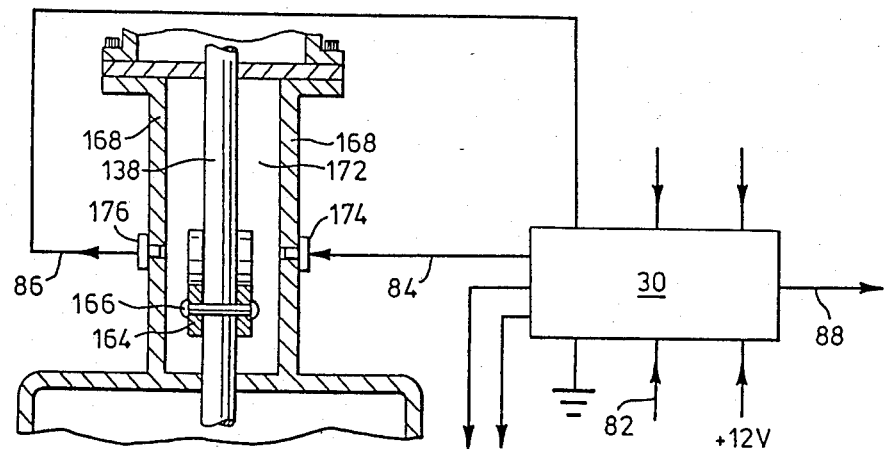
FIG. 3 is a diagram illustrating a portion of the modulator in section and illustrating the connections to the electronic control unit.

As shown in FIG. 2 of the drawings, the pressure regulator 26 is formed with a first stage chamber 90 which received gaseous fuel from conduit 38 through input 36. A valve 92 is mounted on a rocker arm 94 for movement between a position in which it opens the output passage 96 and a position in which it closes output passage 96. A spring 98 biases the rocker arm 94 toward diaphragm 100. The diaphragm 100 is supported in the housing 102 and forms chambers 104 and 106 within the housing. The chamber 106 communicates with the output 40 and with the passage 96 when the valve 92 is in the opened position.

The output 62 of the pressure regulator 26 communicates with the input 60 of the pressure control device 34 through conduit 64. A fixed resistance 108 is formed in the conduit 64.

The pressure control device 34 comprises a housing 110 in which a chamber 112 is formed. A solenoid valve generally identified by the reference numeral 114 is mounted in the chamber 112 and is grounded at 118. The solenoid valve 114 includes an actuator 116 which has one end 120 adapted to seat in the input 60 and its opposite end 122 is adapted to seat in the output 72. A coil spring 124 normally urges the actuator 116 to a position in which the end 120 is seated in the input 60 and closes the input 60.

Flow restrictors 108 are also provided in conduits 70 and 74. The lead 88 to the solenoid 114 communicates with the electronic control device 30 as previously indicated.

The pressure/speed modulator 32 will now be described with reference to FIGS. 2 and 3 of the drawings. As shown in FIG. 2 of the drawings, the modulator 32 comprises a modulator housing generally identified by the reference numeral 126. The housing 126 is a two-part housing which includes a lower housing 128 and an upper housing 130. The lower housing 128 supports a diaphragm 132 which divides it into a lower chamber 134 and an upper chamber 136. The lower chamber 134 communicates with the conduit 42 through conduit 54 and input 52. The output 56 is an output from the upper chamber 136. A shaft 138 has its lower end 140 secured to the diaphragm 132 and is slidably mounted in bearings 142 and 146. A compression spring 148 is compressed between an end plate 150 which is secured to the upper end of the shaft 138 and an end plate 152 which is mounted on an adjustable support shaft 154 which is threaded in the passage 156 which is formed at the upper end of the housing 126. The compression spring 148 normally urges the shaft 138 downwardly which in turn urges the diaphragm 132 to a position minimizing the volume of the lower chamber 134 of the housing 128. A stop screw 158 is threadedly mounted in the passage 160 which is formed in the bottom wall of the housing 128. The upper end of the stop screw 158 forms a support which limits the downward movement of the diaphragm 132.

A blade 162 is mounted on the shaft 138 for movement with the shaft. The blade 162 is formed with a through passage 164 and is secured to the shaft 138 by means of a pin 166. The blade 162 has an upper lanking edge 166 which is contoured to an appropriate contour as will be described hereinafter. The blade 162 is made from an opaque material. A pair of wall panels 168 are mounted in the upper housing 126 and extend in a spaced parallel relationship, one on either side of the blade 162. The walls 168 cooperate with the upper housing 126 to form a darkened chamber 172 therebetween. A plurality of light emitting diodes (LED) 174 are mounted in one wall 168 and a plurality of photo diodes (PD) 176 are mounted in the other wall 168. One LED 174 being disposed directly opposite one PD to form a set of speed indicators. As shown in FIG. 2, the PD's 176 are arranged side by side in a closely spaced relationship. It will be understood that the blade 162 when in its lowest position will be sufficiently low to locate the blanking edge 166 below the level of all of the LED's.

An engine speed governor may be conveniently built in to the modulator. Such a governor is generally identified by the reference numeral 178 and includes a threaded pin 180 which is slidably mounted in a passage 182 which is formed in the upper end of the housing 126. A metal nut 184 is mounted on the pin 180. An ignition wire 186 extends into the govenor 174 and has a free end 188. A grounding wire 190 extends into the governor housing 178 and has a free end 192. The pin 180 is slidable between a lowered position in which the nut 184 is spaced from the free ends 188 and 192 of the lines 186 and 190. When the speed of the engine increases, the blade 162 is raised as will be described hereinafter and will continue to rise with increasing speed until it engages the pin 180 and raises the pin 180 to the point where the nut 184 contacts the free ends 188 and 192 at which point the ignition system will be grounded thereby preventing a further increase in speed of the engine.

Figure 4:
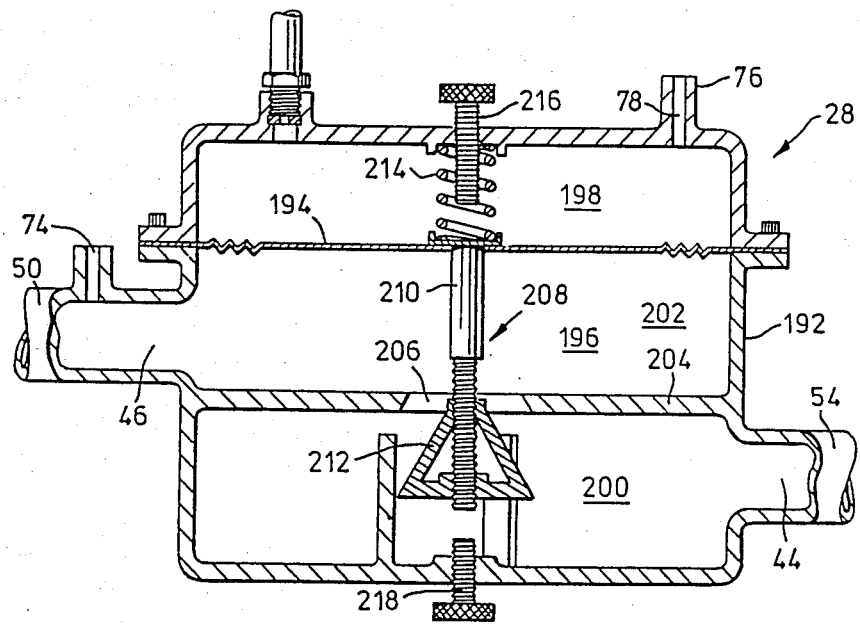
FIG. 4 is a diagram illustrating a section through the flow control valve.

The flow control valve 28 will now be described with reference to FIG. 4 of the drawings. The flow control valve 28 comprises a housing 192 which supports a diaphragm 194 which divides the interior of the housing 192 into first chambers 196 and 198. The first chamber 196 is divided into first and second compartments 200 and 202 by a dividing wall 204 in which a valve passage 206 is formed. A valve actuator generally identified by the reference numeral 208 consists of a shaft 210 which is mounted on the diaphragm 194. A profiled metering valve head 212 is mounted at one end of the shaft 210 and is movable between the position shown in FIG. 4 of the drawings in which the valve passage 206 is open and a position in which it is seated in the valve passage 206 closing the valve passage 206. The flow control valve input 44 communicates with the first compartment 200, and the flow control valve output 46 communicates with the second compartment 202. Lead line 74 extends from the conduit 50 to the pressure control device 34 as previously described.

A compression spring 214 bears against the upper end of the housing 192 and the diaphragm 194 and normally urges the valve head 212 to an open position. A stop screw 216 is mounted in the upper wall of the housing 192 and stop screw 218 is mounted in the lower wall of the housing 192 and serve to provide limits for limiting the movement of the actuator 208.

The electronic control device 30 is in the form of a micro-processor which is programmed to receive the speed signal through line 82 and emit a signal through line 84 to activate the appropriate LED. If the blanking plate 162 is in a position exposing the PD which is opposite the activated LED, the signal is returned to the electronic control unit through line 86 and the electronic control emits a signal through line 88 which activates the solenoid valve 114. The electronic control device may also monitor various other engine function and may receive signals indicative of air temperature, water temperature, throttle position, ignition timing, exhaust gas composition and/or barometric pressure, any or all of which may be used to modify the determination of instantaneous fuel flow required.

METHOD OF OPERATION

When the engine is at rest, the supply of fuel to the engine is prevented by reason of the fact that the valve 92 of the regulator 26 modulator is in the closed position. When the ignition system of the engine 14 is activated, the electronic control device 30 is activated to emit a signal through line 84 to the first LED. Because the pressure in the conduit 42 is atmospheric pressure, the blanking blade 162 of the modulator 32 is in its lowered position so that it does not obscure the passage of light from the first LED to its associated PD. The fact that light is received by the PD is transmitted through line 86 to the electronic control device 30 which emits a signal to the solenoid valve 114 through line 88. When the solenoid valve 114 is activated, the actuator 116 is moved to a position in which the end 120 is spaced from the input 60 and the end 122 closes the output 72. This permits the gas which is in the first stage 90 of the pressure regulator 26 to pass through output 62 into conduit 64 and into the chamber 112 of the pressure control device through input 60. This high pressure gas then passes through output 66, conduit 70 and input 68 into the chamber 104. As the presure in the chamber 104 increases, the diaphragm 100 is deflected and this deflection causes the lever arm 94 of the valve 92 to move to a position opening the valve 92 thereby opening the passage 96 to permit the fuel to flow from the first stage 90 into the conduit 42 through output 40. The fuel will then pass through the control valve 28 which is in its normally open position and enters the air cleaner 18 wherein it is mixed with air and is drawn into the manifold 22 and thereafter is used for combustion in the engine.

If following ignition, the operator removes his foot from the accelerator, the electronic control device will be effective to generate a speed control signal which is the appropriate signal required for activating the LED which corresponds to the engine idle speed and the speed of the engine will increase until the pressure in the fuel supply line 42 increases to an extent sufficient to cause the modulator chamber 134 to be pressurized to an extent to raise the blanking plate 162 to a level sufficient to obscure the passage of light from the activated LED to its associated PD. The interruption of the passage of light from the LED to its associated PD causes a no-light signal to be transmitted through the line 86 to the controller 30 which in response to the receipt of the no-light signal deactivates the solenoid 114 thereby closing the input 60 and opening output 72. As a result of the closing of the input 60 and the opening of the output 72 the pressurized fuel will bleed from the chamber 104 of the pressure regulator to the air/fuel intake 18 and the resulting pressure drop will cause the diaphram 100 to move the valve 92 to a position reducing the size of the passage 96 thereby reducing the flow of fuel from the regulator. The result of this reduction in the flow of fuel will be a reduction in the engine speed and the engine speed will be reduced until the pressure in the pressure/speed modulator 32 is reduced to an extent sufficient to cause the blade 162 to move to a level exposing the PD to the eliminated LED which will in turn cause the modulator to emit a light received signal through line 86 to the electronic control 30. The electronic control 30 will then activate the solenoid 114 through line 88 to once again open the input 60 to admit fuel under pressure into the chamber 112 which will again pressurize the chamber 104 of the pressure regulator and cause the valve 92 to move towards a more open position. In this manner, it will be apparent that the engine speed will be controlled within a narrow range of the optimum idle speed. When it is necessary to increase the engine speed, the operator activates the accelerator pedal which has the effect of opening the throttle 20 to admit a greater volume of fuel charge to the engine. The opening of the throttle also lowers the manifold vacuum which in turn increases the pressure in the compartment 198 of the flow control valve 28 thereby moving the valve member 212 away from seat 206 to increase the supply of fuel to the engine. As a result of the increased fuel supply the engine speed increases and the electronic control device 30 is operable to activate the different LED for each increment of increase in engine speed. In the embodiments illustrated in FIG. 2 of the drawings, the LED's are successively illuminated from right to left such that the LED's at the left of the row of LED's are associated with higher speeds and are spaced a greater distance from the blanking edge 166 of the blade 162 such that they will remain exposed over a greater portion of the length of travel of the blanking blade 162. As the engine speed increases, the electronic control device 30 will maintain the pressure control valve 34 in the position in which the input 60 is open and the output 72 is closed to pressurize the chamber 104 thereby to open valve 92 to continue to increase the pressure of the fuel discharged by the pressure regulator until the blanking blade 162 of the modulator is raised to interrupt the passage of light from the elimated LED to its corresponding PD. Thus it will be seen that the flow control system described above is effective in delivering gaseous fuel under pressure to an engine in a manner which will ensure that the flow rate of the fuel is appropriate for any instantaneous engine speed.

If the engine speed exceeds a predetermined maximum engine speed, the govenor 178 is effected to interrupt the ignition system which prevents excessive engine speed.

It will be apparent that the contour of the blanking edge 166 of the blanking blade 162 determines the pressure at which pressurized fuel is discharged from the pressure regulator for a particular engine speed. In addition, it will be apparent that the profile of the valve head 212 of the flow control valve 28 determines the flow rate from the flow control valve to the engine for a particular manifold vacuum pressure.

The basic procedure for determining the contour of the blanking edge 166 of the blanking plate 162 and the profile of the valve head 212 is as follows. The engine in association with which the fuel control system is to be used is run on a dynamometer at various combinations of speed and manifold vacuum (and any other desired variables such as air temperature). The air induction flow rate is recorded at each condition together with the required fuel rate to give the desired air/fuel ratio at each operating condition. A manually operated flow valve, pressure regulator and flow meter are used to obtain the graph relating fuel flow rate to a plurality of combinations of valve opening area and pressure differential across the flow control valve. With this information, it is possible to determine the desired contour and profile utilizing the available tailoring provided by the various adjustable stops, springs, orifices and location of the various ports in the fluid streams so that dynamic (Pitot) pressures can be employed to provide, for example, a non-linear relationships. It has been found that the same electronic control unit and blanking plate contour can be used on a wide variety of engine types and sizes, however, major changes in bore:stroke ratio, combustion chamber design, valve timing or breathing efficiency may necessitate a revision.

The maximum fuel flow can be set simply by altering the characteristics of the spring 148 or the gain of the electronic control unit 30 in relation to the engine displacement and heating value of the fuel. It will also be apparent that the engine speed signal may be obtained from the ignition system or a magnetic device or proximity device located on a rotating component of the engine. In the latter case, the flow control systems presently mentioned can be employed on a compression-ignition engine to provide gaseous fuel supplementing, in which case the flow control valve may be regulated by a component whose position is indicative of the amount of diesel fuel or the like being consumed such as an injector control rod.

Figure 5:
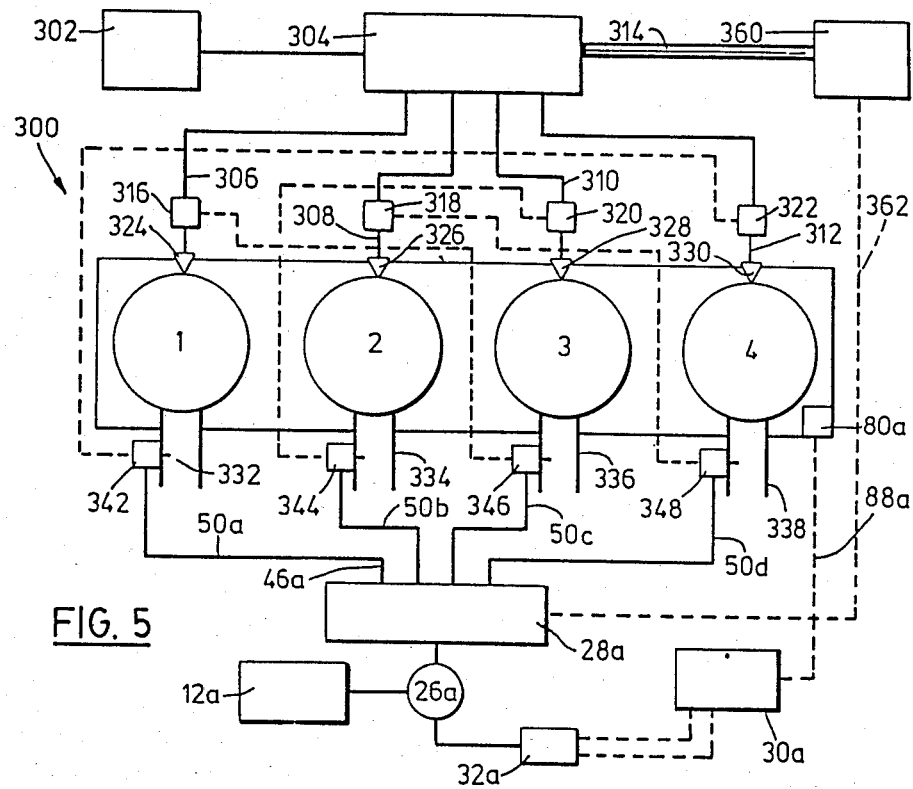
FIG. 5 is a diagram illustrating the fuel control system applied to a diesel engine.

A typical application of the flow control system of the present invention to a diesel engine is illustrated in FIG. 5 of the present invention.

With reference to FIG. 5 of the drawings, it will be seen that the diesel engine 300 has cylinders 1, 2, 3 and 4. For the purposes of this discussion, the firing order of the engine may be taken to be 1, 3, 2, 4. Diesel fuel is supplied to the engine 300 from a fuel storage tank 302 by means of a diesel pump 304 and fuel lines 306, 308, 310 and 312. The operation of the diesel pump 304 in delivering diesel fuel to the supply lines 306, 308, 310 and 312 is controlled by an injection control mechanism which includes a reciprocating shaft 314. Pressure sensing devices 316, 318, 320 and 322 are associated with the fuel supply lines 306, 308, 310 and 312 respectively. The diesel fuel is injected into cylinders 1, 2, 3 and 4 through injector nozzles 324, 326, 328 and 330 respectively. Fresh induction air is confined in either an air induction passage, a transfer passage or the engine cylinder following the closure of the exhaust valve or exhaust port of a diesel engine and the confinement space is diagrammatically represented at 332, 334, 336, and 338 in association with the cylinders 1, 2, 3 and 4 respectively. A flow control valve 28a has a plurality of outputs 46a which are connected through conduits 50a, 50b, 50c and 50d to solenoid valves 342, 344, 346 and 348. The pressure sensing devices 316, 320, 318 and 322 are connected to the solenoid valves 346, 344, 348 and 342 respectively.

Gaseous fuel is supplied from a gaseous fuel storage tank 12a through pressure regulator 26a which is modulated by modulator 32a and controlled by electronic unit 30a in a like manner to that described with reference to the system illustrated in FIG. 1 of the drawings. In use when the pressure in the diesel fuel supply line 306 increases towards the diesel fuel injection pressure, the pressure sensing device 316 is activated to send a signal to the solenoid valve 346 to open with the result that gaseous fuel from the line 50c is admitted to the fresh charge storage 336. This procedure is repeated for each successive cylinder in the firing order with the result that gaseous fuel is admitted to the source of the fresh air charge of the cylinder next following the cylinder in which combustion is taking place. The timing of the opening of the solenoid valves 342, 344, 346 and 348 is controlled such that the gaseous fuel is not admitted until substantially all of the exhaust has been evacuated from the cylinder from which the gaseous fuel is to be admitted. This serves to increase the fuel efficiency by eliminating wastage of fuel which would otherwise occur if the fuel is constantly admitted with air into the combustion chamber during the exhaust cycle.

Figure 6:
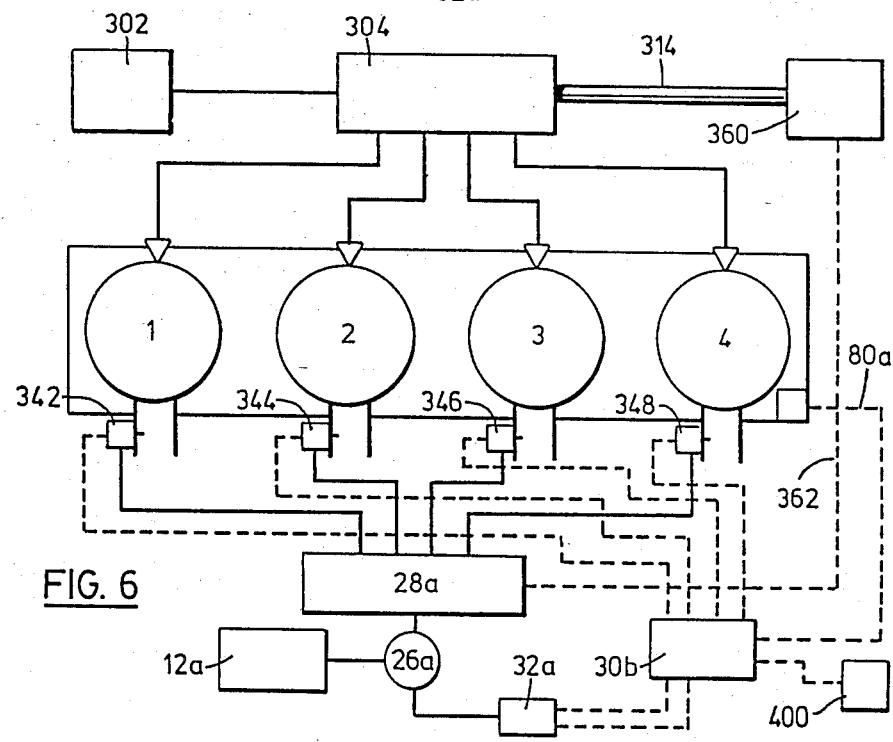
FIG. 6 is a diagram illustrating the fuel control system applied to a diesel engine in accordance with a further embodiment of the invention.

In the embodiment illustrated in FIG. 6 of the drawings, the solenoid valves 342, 344, 346 and 348 are activated by the electronic control device 30b which receives a timing signal from an ignition timing device 400 and activate the valves 342, 344, 346 and 348 in the required sequence and at the required timing intervals in accordance with the timing signal which it receives.

In both of the embodiments illustrated in FIGS. 5 and 6 of the drawings the position of the injector control rod 314 may be monitored by a suitable control device 360 so as to generate a control signal which is directed through line 362 to the flow control valve 28a so as to control the flow rate of the gaseous fuel in relation to the flow rate of the diesel fuel.

It will apparent from FIGS. 5 and 6 of the drawings, that the fuel supply to a diesel engine or the like may be supplemented by supplying gaseous fuel in an efficient manner which ensures that the gaseous fuel is only supplied at the time intervals when it can be taken into the engine for combustion. In a like manner to that previously discribed for spark ignition systems a governor may be employed to provide solenoid lock-offs on the fuel supply lines, should the desired maximum engine speed be exceeded.

Figure 7:
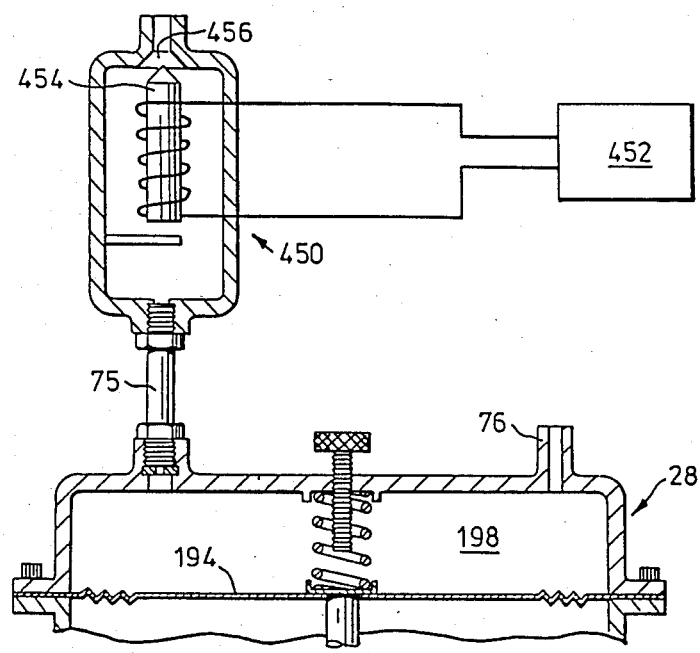
FIG. 7 is a diagram illustrating a modification to the flow control valve which serves to lean the mixture when a requirement for a leaner mixture is determined by an oxygen sensor control.

There is an increasing requirement for oxygen sensor control systems in the operation of internal combustion engines and the fuel control system of the present invention can easily be adapted to provide oxygen sensor control. As shown in FIG. 7 of the drawings, a solenoid valve 450 is located in the vent line 75 which opens from the chamber 198 of the flow control valve 28. The solenoid valve 450 communicates with a conventional oxygen sensor device 452 which is arranged to determine the oxygen content of the exhaust and to supply an electrical signal to the solenoid 450 when the oxygen content is undesirably low. Upon receipt of this electrical signal, the solenoid valve 450 is activated such that the actuator 454 moves to a position enclosing the port 456 thus preventing venting of the chamber 198. When venting of the chamber 198 is prevented, the full manifold vacuum is applied to the chamber 198 through the input 76 which moves the diaphragm 194 to move the profiled valve head 212 (FIG. 4) toward its closed position with respect to the output 206 thereby reducing the flow of fuel through the flow control valve and effectively leaning the combustion mixture.

Figure 8:
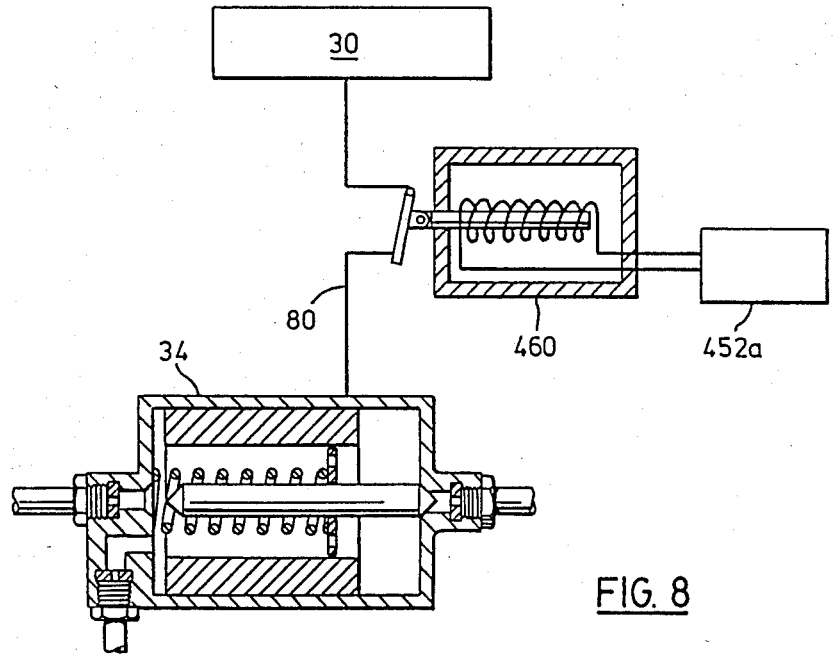
FIG. 8 is a diagram illustrating a mixture leaning device applied to the pressure control modulator.

FIG. 8 of the drawings illustrates a further embodiment wherein the signal emitted by the oxygen sensor 452a is transmitted to a switch 460 in the line 80 which connects the electronic control device 30 to the pressure control device 34. In use, when an excessively low oxygen content is detected, the sensor 452a activates the switch 460 to interrupt the line 88 thereby to deactivate the pressure control device 34 so as to interrupt the supply of high pressure gas from the compartment 90 of the pressure regulator (FIG. 2) to the diaphragm chamber 104 thereby causing the valve 92 to move toward a closed position to reduce the gas pressure in the output conduit 42 and thereby to reduce the supply of gas to the engine and thereby lean the mixture. It will also be apparent that engine to which gaseous fuel is supplied may also have conventional connections to a source of gasoline or the like in which case suitable "lock-off" devices are provided in the gaseous and liquid fuel supply lines together with a suitable switching mechanism for use in switching from one fuel to the other. The change-over from one fuel to the other is made easy by the fact that the gasoline caburetion system is not modified to receive the gaseous fuel and no restrictions are placed in the air:fuel supply line or in the air:fuel supply manifold. It will also be apparent that an automatic "lock-off" will be provided between the fuel source 12 and the regulator 26 which will close down when the engine stops to prevent the flow of gaseous fuel to the engine.

Various modifications of the present invention will be apparent to those skilled in the art without departing from the scope of the invention. It will be apparent that the state of the art in electronic controls is such as to permit many modifications and additions to be made to the electronic control unit so that it may, for example, provide a timed primer, remote LED tachometer display or LED timing advance display, cyclic RPM variation display or detonation sensor or the like. It will also be apparent that other forms of speed indicators may be used in place of the LED's and PD's.

I claim:

1. In a diesel engine having a plurality of cylinders, each having associated therewith a diesel fuel input line and an air input through which a fresh charge of induction air is induced, a fuel pump communicating with each diesel fuel line for sequentially supplying fuel under pressure to each diesel fuel line in the required firing order, the improvement of a fuel control system for use in providing a timed supply of gaseous fuel from a high pressure source to each air input comprising:
   (a) a flow control means associated with each air input, said flow control means being adapted to open to communicate with its associated air input to admit gaseous fuel to said air input and to close to interrupt commication with its associated air input,
   (b) means for supplying gaseous fuel under pressure to each flow control means,
   (c) means associated with each cylinder for determining when diesel fuel is being injected into its associated cylinder and generating a control signal which indicates when fuel injection occurs at its cylinder and communicates said control signal to the fuel control means associated with the cylinder which is next in the firing order to that receiving diesel fuel such that the control signal is effective to open said flow control means to admit gaseous fuel to the input air of said cylinder which is next in firing order.

2. The improvement of claim 1, wherein said means for determining when diesel fuel is being injected into each cylinder comprises pressure sensing means associated with each diesel fuel input line for generating said control signal.

3. The improvement of claim 1, wherein said means for determining when diesel fuel is being injected comprises means for determining the position of the engine crank shaft and rotational speed of the engine.

4. In a diesel engine having a plurality of cylinders, each having associated therewith a diesel fuel input line and an air input through which a fresh charge of induction air is induced, a fuel pump communicating with each diesel fuel line for sequentially supplying fuel under pressure to each diesel fuel line in the required firing order, the improvement of a fuel control system for use in providing a timed supply of gaseous fuel from a high pressure source to each air input comprising:
   (a) a flow control means associated with each air input, said flow control means being adapted to open to communicate with its associated air input to admit gaseous fuel to said air input and to close to interrupt communication with its associated air input, said flow control means comprising;
   (I) a pressure regulator having an input for receiving pressurized gaseous fuel from a source and an output for discharging gaseous fuel, said pressure regulator being adapted to maintain a constant pressure in the discharging fuel for a given engine speed regardless of flow rate and to increase or decrease the pressure in the discharging gaseous fuel in response to an increase or decrease in engine speed,
   (II) a first flow control valve having an input communicating with the output of said pressure regulator and a plurality of outputs,
   (III) a second flow control valve associated one with each fresh air input and communicating with said first flow control valve, said second flow control valves each having a valve actuator member which communicates with said means which is indicative of engine loading conditions so as to be operable to control the flow of gaseous fuel from its output in response to engine loading conditions regardless of engine speed,
   (IV) control means communicating with said engine for measuring the speed of the engine and generating a first signal which is indicative of the engine speed,
   (V) modulator means communicating with the output from the pressure regulator to measure the pressure of the fuel supply to the flow control valve, said modulator also communicating with the control means to receive said first signal, said modulator means being adapted to compare the measured pressure with the measured speed and to generate a third signal which is indicate of an undesirably low pressure or a fourth signal which is indicative of an undesirably high pressure, said third or fourth signals being communicated to said control means, (VI) pressure control means communicating with said pressure regulator to increase or decrease the pressure in the gaseous fuel output in response to the receipt of said third or fourth signals respectively, (b) means for supplying gaseous fuel under pressure to each flow control means, (c) means for determining when diesel fuel is being injected into each cylinder and generating a control signal which indicates when fuel injection occurs and communicates said control signal to the fuel control means associated with the cylinder which is next in the firing order to that receiving diesel fuel such that the control signal is effective to open said flow control to admit gaseous fuel to the input air of said cylinder which is next in firing order.

5. The improvement of claim 4 wherein said pressure control means comprises an actuator which is movable between a first position in which it acts upon the regulator to increase the pressure in the gaseous fuel output of the regulator and a second position in which it acts upon the regulator to decrease the pressure in the gaseous fuel output of the regulator, said pressure control means communicating with said control means to receive said third or fourth signals to move said actuator to said first position in response to receipt of said third signal and to said second position in response to receipt of said fourth signal, whereby the fuel supply pressure, engine loading and engine speed are constantly monitored and the fuel supply pressure and fuel flow rate are regulated to adjust the fuel supply toward the optimum fuel supply for the monitored engine operating conditions.

6. The improvement of claim 4 wherein said pressure regulator comprises:

(i) a first stage pressure chamber communicating with said input to receive pressurized gaseous fuel from said source, (ii) a diaphragm actuated valve in said output for controlling the flow of gaseous fuel from said first stage through said output, said diaphragm actuated valve having a first diaphragm chamber, and wherein said pressure control means comprises:

(i) a first conduit connecting said first stage pressure chamber to said first diaphragm chamber, (ii) pressure control valve means in said first conduit, (iii) an actuator in said pressure control valve which is movable between a first position opening said first conduit and a second postion closing said first conduit to permit or prevent the passage of pressurized gaseous fuel from said first stage to said first diaphragm chamber, said actuator communicating with said control means to receive said third or fourth signals to move said actuator to said first position and said second position in response to receipt of said third and fourth signals respectively.

7. The improvement of claim 4 wherein said modulator means comprises:

(a) a modulator housing supporting a second diaphragm therein which defines a movable wall of a second diaphragm chamber, (b) conduit means forming the communication between said output of said pressure regulator and said second diaphragm chamber, (c) an opaque blade mounted on said second diaphragm for reciprocating movement in response to movement of said second diaphragm, said opaque blade moving to an fro along a path which extends in a first plane, said opaque blade having a contoured edge extending transversely of said path, (d) a plurality of sets of speed indicators mounted on said modulator housing, each speed indicator consisting of an LED and a light receiver arranged opposite one another on opposite sides of said plane, each LED being activated by said control means to emit light when the engine speed corresponds to the engine speed assigned to it, said light receivers communicating with said control means to transmit a light received signal or a no light received signal to said control means whereby the pressure at the output of the pressure regulator is applied to the second diaphragm chamber and displaces the second diaphragm which in turn displaces the opaque blade such that location of the contoured edge of the opaque blade is determined by the pressure of the output from the regulator and the opaque blade interrupts or permits the passage of light from the activated LED to its associated receiver to cause the receiver to emit a light signal or a no light signal if the engine speed is less than or greater than the optimum speed at the measured output pressure from the regulator, the light or no light signals being transmitted to the control means which generates said third signal when it receives a light received signal and said fourth signal when it receives a no light received signal.

8. The improvement of claim 4 wherein said modulator means further comprises governor means engagable by said opaque blade and operable to interrupt the engine ignition system when the blade rises to a height indicative of an undesirably high engine speed.

* * * * *